US011873659B2

(12) United States Patent
Xu et al.

(10) Patent No.: US 11,873,659 B2
(45) Date of Patent: Jan. 16, 2024

(54) TRANSPORTABLE FOLDING DOOR

(71) Applicant: ZheJiang Bounsun Plastic Co., Ltd., Taizhou (CN)

(72) Inventors: Xiufeng Xu, Taizhou (CN); Bin Jin, Taizhou (CN)

(73) Assignee: ZheJiang Bounsun Plastic Co., Ltd., Taizhou (CN)

( * ) Notice: Subject to any disclaimer, the term of this patent is extended or adjusted under 35 U.S.C. 154(b) by 591 days.

(21) Appl. No.: 17/131,689

(22) Filed: Dec. 22, 2020

(65) Prior Publication Data

US 2022/0136280 A1 May 5, 2022

(30) Foreign Application Priority Data

Nov. 2, 2020 (CN) ......................... 202011203161.2

(51) Int. Cl.
*E05B 1/00* (2006.01)
*E06B 3/94* (2006.01)

(52) U.S. Cl.
CPC .............. *E05B 1/0015* (2013.01); *E06B 3/94* (2013.01)

(58) Field of Classification Search
CPC ........... E05B 1/0015; E06B 3/94; E06B 3/921
See application file for complete search history.

(56) References Cited

U.S. PATENT DOCUMENTS 2,713,897 A * 7/1955 Walter .................. E05B 1/0015 292/14
4,199,018 A * 4/1980 Hirschel ................... E06B 3/94 160/84.08
4,357,981 A * 11/1982 Labelle ................... E06B 3/481 160/183
4,429,493 A * 2/1984 St. Aubin ................ E06B 3/365 49/367
4,475,313 A * 10/1984 Governale .......... E05B 65/0811 292/101
4,834,161 A * 5/1989 Johnson .................... E06B 5/16 160/199
6,637,784 B1 * 10/2003 Hauber ................. E05B 65/087 292/300
6,935,662 B1 * 8/2005 Hauber ................. E05B 65/087 292/302
7,886,804 B2 * 2/2011 Goodman ................. E06B 3/94 160/199

(Continued)

*Primary Examiner* — Beth A Stephan
(74) *Attorney, Agent, or Firm* — Bayramoglu Law Offices LLC

(57) ABSTRACT

A transportable folding door includes a folding door body and a door handle bar arranged on a side of the folding door body. A handle is arranged on the door handle bar. The folding door body is made of a flexible polyester material. The door handle bar is formed by splicing a plurality of supporting bars, and a connecting assembly is arranged between two adjacent supporting bars. Connecting holes are separately formed at a connection of the two adjacent connected supporting bars, and the connecting assembly is fixedly connected to the connecting holes of the two adjacent connected supporting bars. The connecting assembly includes a clamping bar with a U-shaped cross section, connecting columns, and a connecting piece. Both ends of the clamping bar are separately provided with receiving holes corresponding to the connecting holes on the two adjacent connected supporting bars.

8 Claims, 5 Drawing Sheets

(56) References Cited

U.S. PATENT DOCUMENTS

| | | | | |
|---|---|---|---|---|
| 8,109,315 | B2 * | 2/2012 | Schneider | E05B 63/0004 292/156 |
| 8,336,597 | B2 * | 12/2012 | Laraway | E06B 3/94 160/40 |
| 8,641,105 | B2 * | 2/2014 | Goodman | H01F 7/04 292/251.5 |
| 9,074,420 | B2 * | 7/2015 | Goodman | E05D 15/26 |
| 9,322,203 | B2 * | 4/2016 | Kleiman | E05D 15/063 |
| 9,464,457 | B2 * | 10/2016 | Koyama | E06B 3/481 |
| 9,650,823 | B2 * | 5/2017 | Svenson | E06B 3/481 |
| 2006/0200948 | A1 * | 9/2006 | Steurer | F25D 23/028 16/412 |
| 2007/0169899 | A1 * | 7/2007 | Cianciolo | E05D 15/58 160/211 |
| 2008/0157544 | A1 * | 7/2008 | Phipps | E06B 7/16 49/368 |
| 2009/0044918 | A1 * | 2/2009 | Goodman | E05B 65/0085 160/202 |
| 2009/0188633 | A1 * | 7/2009 | Goodman | E06B 3/94 160/84.08 |
| 2013/0133844 | A1 * | 5/2013 | Smart | E06B 3/94 52/745.19 |
| 2016/0017651 | A1 * | 1/2016 | Svenson | E06B 3/481 52/855 |

* cited by examiner

TRANSPORTABLE FOLDING DOOR

CROSS REFERENCE TO THE RELATED APPLICATIONS

This application is based upon and claims priority to Chinese Patent Application No. 202011203161.2, filed on Nov. 2, 2020, the entire contents of which are incorporated herein by reference.

TECHNICAL FIELD

The present invention belongs to the technical field of folding doors, and more particularly, to a transportable folding door.

BACKGROUND

Folding door is a term commonly used in the field of furniture. Folding doors are mainly used for partitions, screens, and interior and exterior doors in workshops, shopping malls, office buildings, showrooms and home furnishings. Folding doors can effectively play a role in temperature insulation, dust prevention, noise reduction, sound insulation, shielding and so on.

With the development of online shopping and logistics industry, the purchased folding doors are typically transported by express delivery. However, a traditional folding door includes a door handle bar with a height that is almost equal to the height of the folding door itself, resulting in an increased length of the package in the process of transportation, which is not conducive to transportation, and also increases the cost of transportation.

SUMMARY

In view of the shortcomings identified in the prior art, an objective of the present invention is to provide a transportable folding door with a simple structure.

In order to achieve the above-mentioned objective, the present invention adopts the following technical solution. A transportable folding door includes a folding door body and a door handle bar arranged on a side of the folding door body. A handle is arranged on the door handle bar. The folding door body is made of a flexible polyester material. The door handle bar is formed by splicing a plurality of supporting bars, and a connecting assembly is arranged between two adjacent supporting bars.

Further, connecting holes are separately formed at a connection of the two adjacent connected supporting bars, and the connecting assembly is fixedly connected to the connecting holes of the two adjacent connected supporting bars.

Further, the connecting assembly includes a clamping bar with a U-shaped cross section, connecting columns, and a connecting piece. Both ends of the clamping bar are separately provided with receiving holes corresponding to the connecting holes on the two connected supporting bars. The connecting column is inserted into the connecting holes, and both ends of the connecting column separately extend out of the connecting holes on both sides of the clamping bar. The connecting piece is configured to fixedly connect two connecting columns located at an identical end of the clamping bar.

Further, the handle is formed in the middle of the connecting piece.

Further, the connecting column includes a supporting portion and a connecting portion arranged on each of both sides of the supporting portion. A plurality of uniformly distributed limiting grooves are arranged on the connecting portion. A connecting protrusion is formed on each of both sides of the connecting piece, and a mounting cavity is formed on the end face of the connecting protrusion. Limiting ribs fitted to the limiting grooves are formed on the inner wall of the mounting cavity.

Further, a connecting block fitted to the connecting hole and the receiving hole is formed at the connection between the connecting portion and the supporting portion.

Further, the door handle bar is formed by splicing two supporting bars with an identical length.

Further, the clamping bar is made of aluminum alloy, and each of the connecting column and the connecting piece is made of plastic and formed by injection molding.

Further, a plurality of uniformly distributed limiting protrusions are arranged on both sides of the limiting groove.

Further, the cross section of the supporting portion is cross-shaped.

Compared with the prior art, the present invention has the following advantages.

1. The folding door body is made of a flexible polyester material, and thus can be laterally bent and folded in the process of transportation, thereby reducing the overall length. The door handle bar is formed by splicing a plurality of supporting bars, so that the folding door can be entirely folded, thereby shortening the packaging length in the process of transportation to facilitate the transportation while reducing packaging and transportation costs.
2. The clamping bar is set to prevent the connection of the supporting bars from shaking, and the limiting column cooperates with the connecting piece to ensure the stability and strength of the connection between the supporting bars.
3. The handle is formed in the middle of the connecting piece, thereby reducing the accessories and the production cost.
4. The limiting ribs and the limiting grooves are engaged to ensure the stability of the connection between the connecting column and the connecting protrusion.
5. The connecting block fitted to the connecting hole and the receiving hole is formed at the connection between the connecting portion and the supporting portion, thereby securely fixing the supporting bars and reducing the probability of disengagement of the connecting column.
6. The door handle bar is formed by splicing two supporting bars with an identical length, so that the folding door body only needs to be folded once to reduce the overall packaging length without damaging the folding door body.
7. The clamping bar is made of aluminum alloy, which not only ensures the overall weight of the clamping bar, but also ensures the overall structural strength of the clamping bar. Each of the connecting column and the connecting piece is made of plastic and formed by injection molding.
8. A plurality of uniformly distributed limiting protrusions are arranged on both sides of the limiting groove, so as to further ensure the reliability of the connection between the connecting column and the connecting protrusion.

In the figures: 1—folding door body, 2—supporting bar, 3—connecting hole, 4—clamping bar, 5—connecting column, 5*a*—supporting portion, 5*b*—connecting portion, 5*c*—connecting block, 6—connecting piece, 6*a*—handle, 6*b*—connecting protrusion, 7—receiving hole, 8—limiting groove, 9—mounting cavity, 10—limiting rib, and 11—limiting protrusion.

DETAILED DESCRIPTION OF THE EMBODIMENTS

Figure 1:
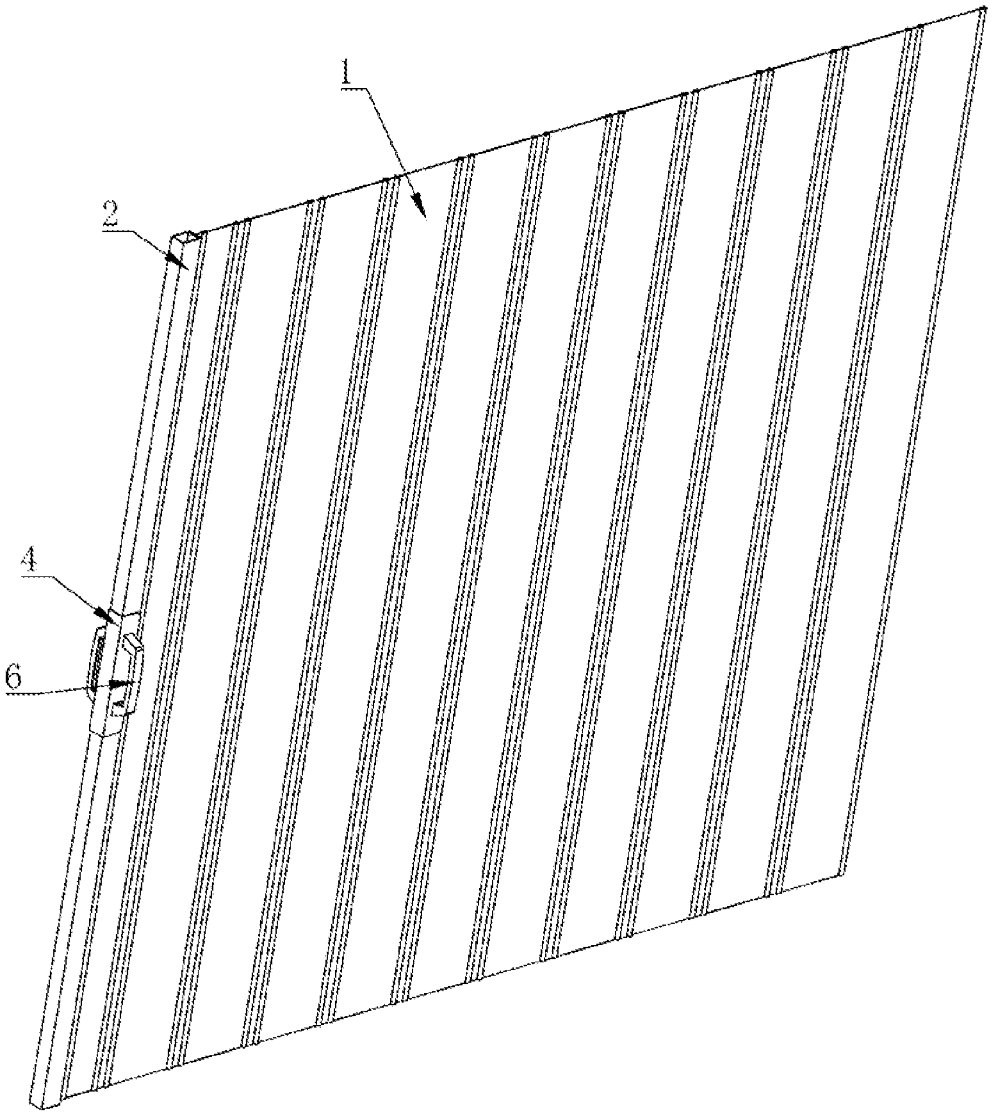
FIG. 1 is a schematic diagram of the structure of the present invention.
Figure 2:
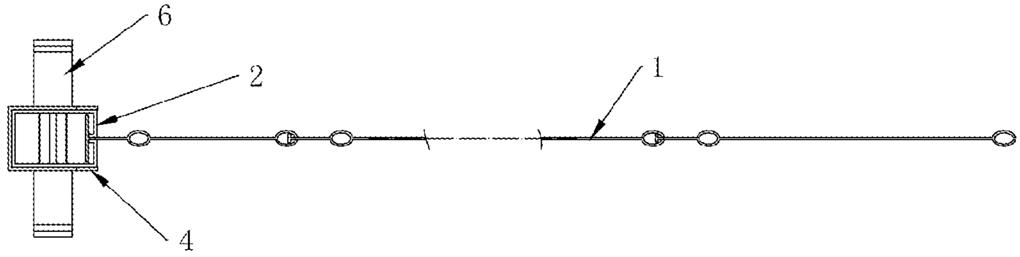
FIG. 2 is a top view of the present invention.
Figure 3:
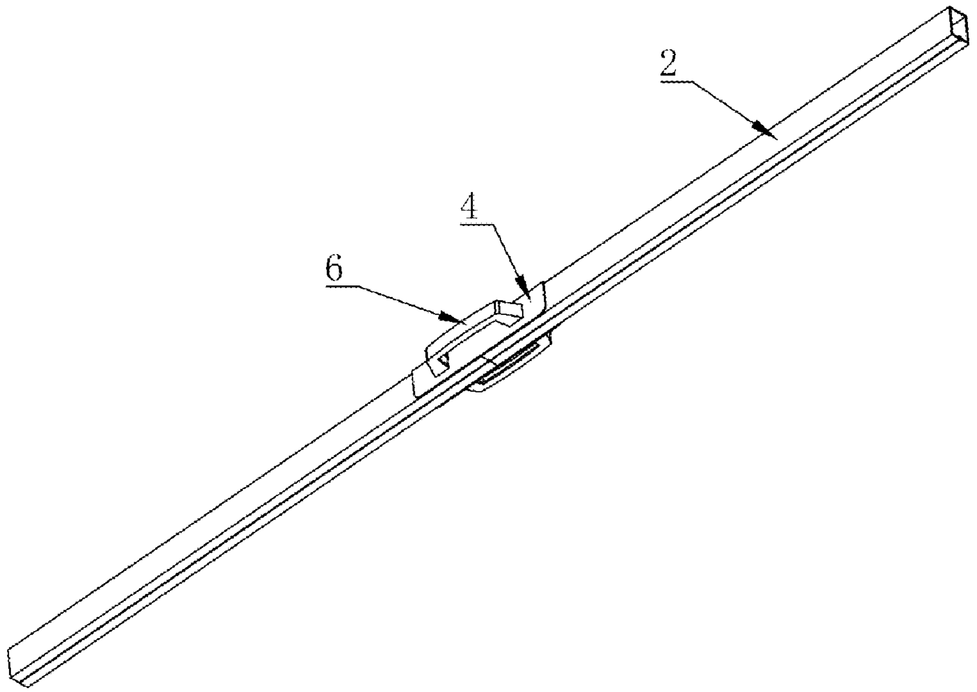
FIG. 3 is a schematic diagram of the assembly of a door handle bar according to the present invention.
Figure 4:
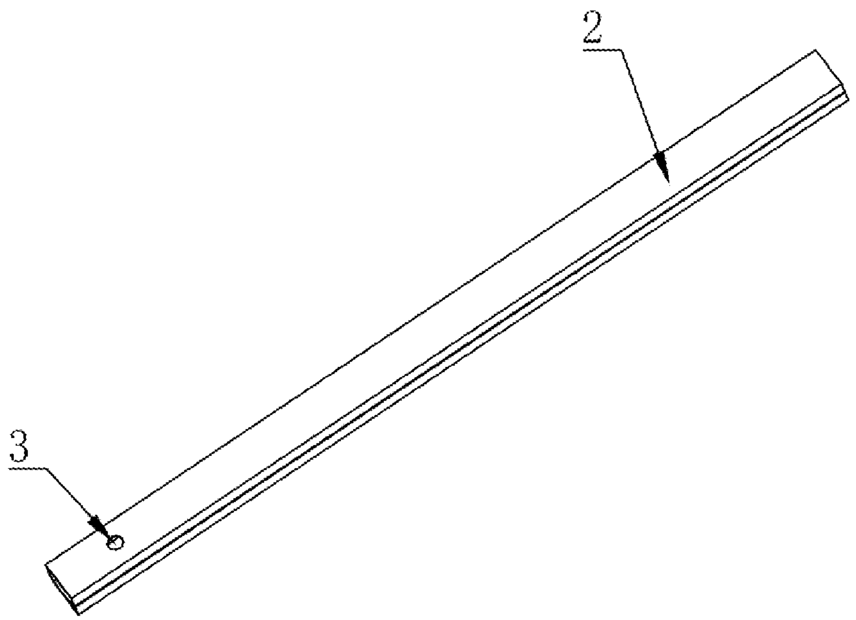
FIG. 4 is a schematic diagram of the structure of a supporting bar according to the present invention.
Figure 5:
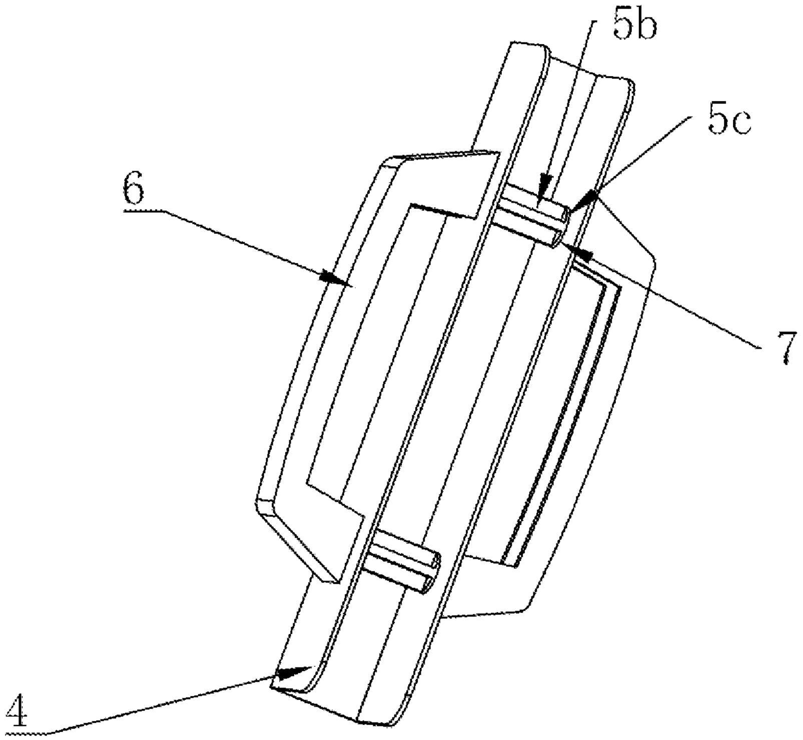
FIG. 5 is a schematic diagram of the structure of a connecting assembly according to the present invention.
Figure 6:
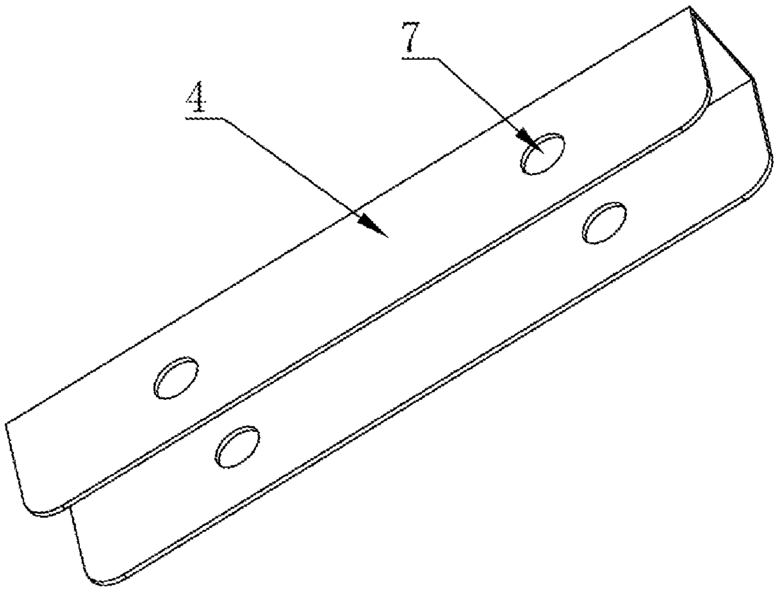
FIG. 6 is a schematic diagram of the structure of a clamping bar according to the present invention.
Figure 7:
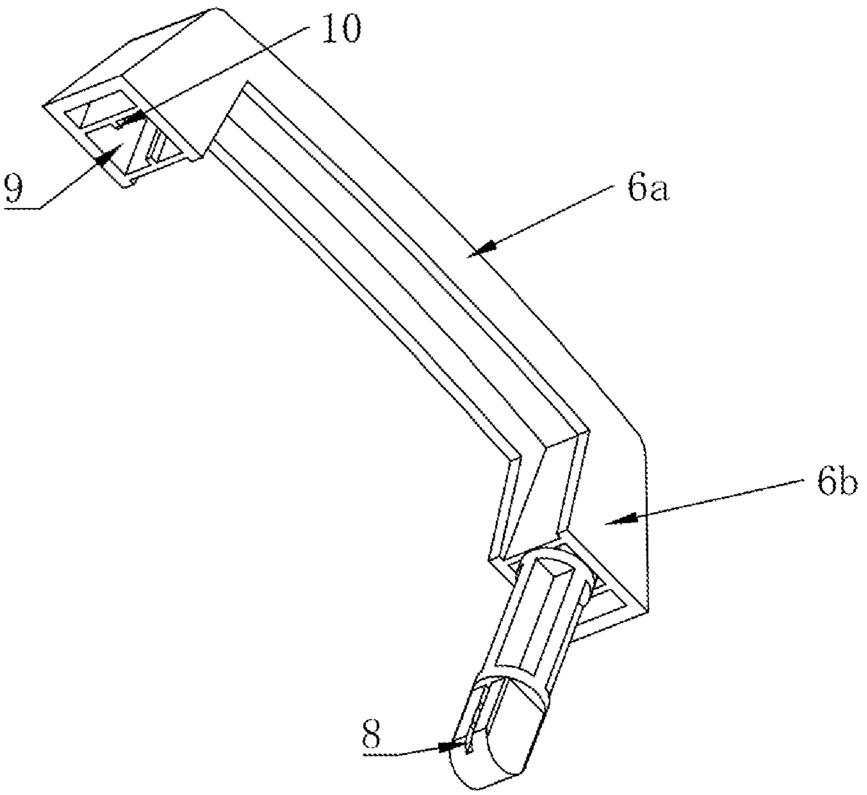
FIG. 7 is a schematic diagram of the assembly of the connecting piece and the connecting column according to the present invention.
Figure 8:
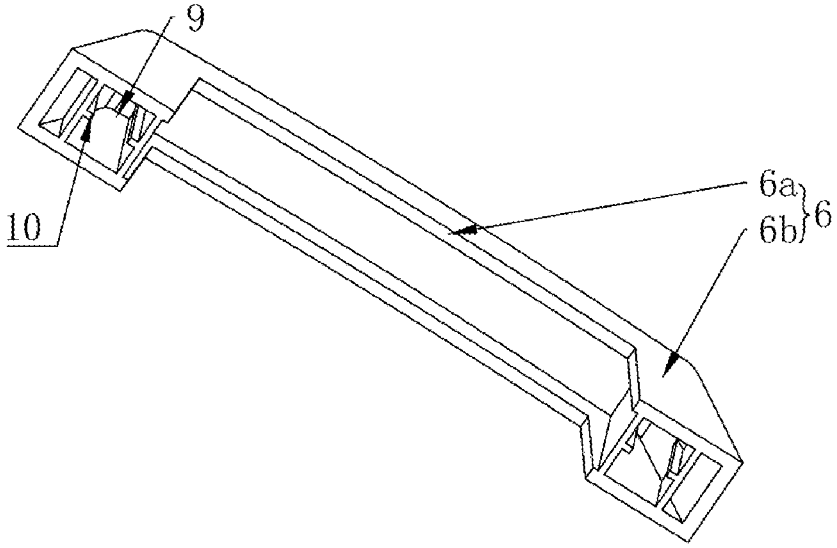
FIG. 8 is a schematic diagram of the structure of the connecting piece according to the present invention.
Figure 9:
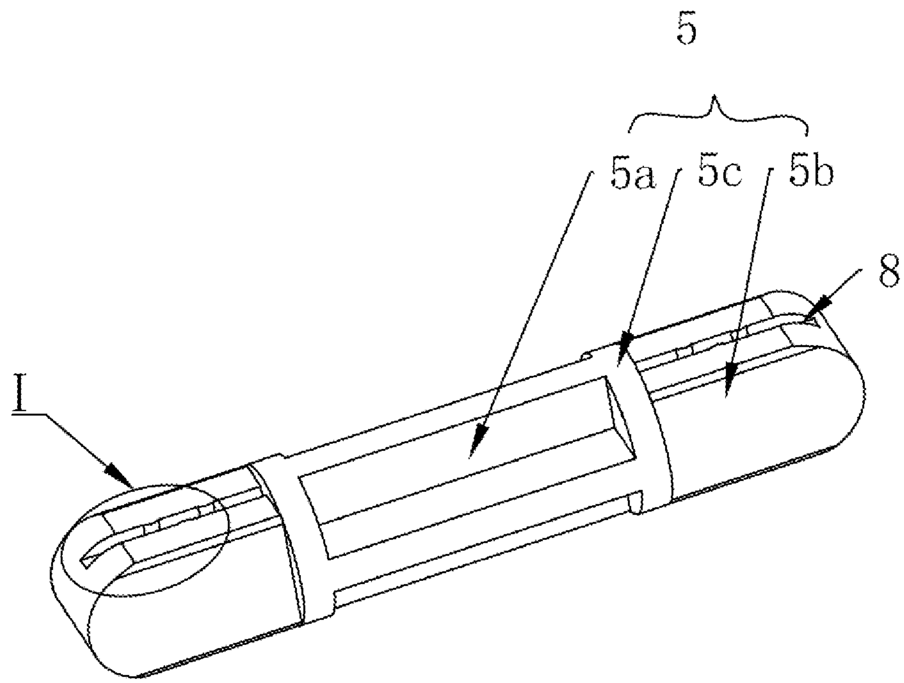
FIG. 9 is a schematic diagram of the structure of the connecting column according to the present invention.
Figure 10:
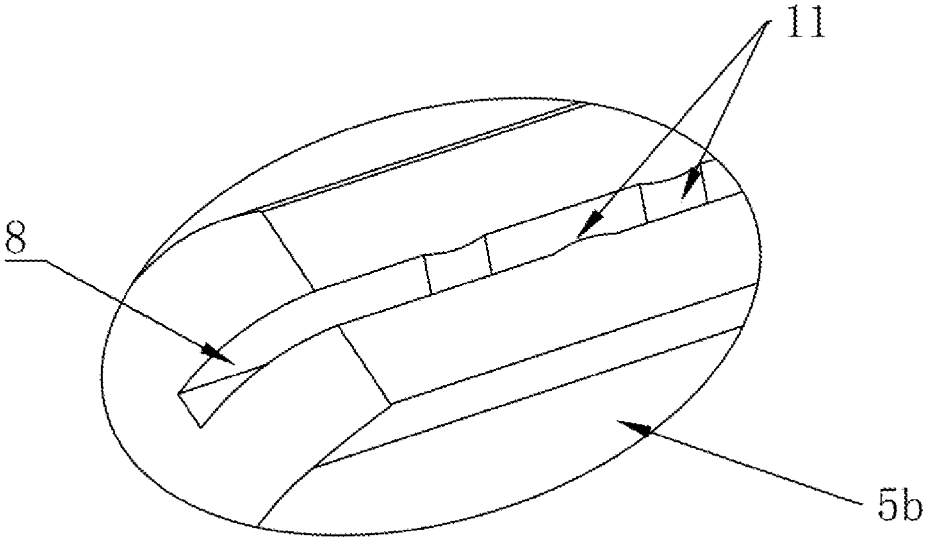
FIG. 10 is the enlarged view of the portion I circled in FIG. 9.

An embodiment of the present invention is further illustrated with reference to FIGS. 1 to 10.

A transportable folding door includes the folding door body 1 and the door handle bar arranged on a side of the folding door body 1. The handle 6*a* is arranged on the door handle bar. The folding door body 1 is made of a flexible polyester material. The door handle bar is formed by splicing a plurality of supporting bars 2, and a connecting assembly is arranged between two adjacent supporting bars 2.

By adopting the above technical solution, the folding door body 1 is made of a flexible polyester material, and thus can be laterally bent and folded in the process of transportation, thereby reducing the overall length. The door handle bar is formed by splicing a plurality of supporting bars 2, so that the folding door can be entirely folded, thereby shortening the packaging length in the process of transportation to facilitate the transportation while reducing packaging and transportation costs.

Further, the connecting holes 3 are separately formed at the connection of the two adjacent connected supporting bars 2, and the connecting assembly is fixedly connected to the connecting holes 3 of the two adjacent connected supporting bars 2.

By adopting the above technical solution, the connecting holes 3 and the connecting assembly are set to facilitate the installation and fixing of the door handle bar.

Further, the connecting assembly includes the clamping bar 4 with a U-shaped cross section, the connecting columns 5, and the connecting piece 6. Both ends of the clamping bar 4 are separately provided with the receiving holes 7 corresponding to the connecting holes 3 on the two connected supporting bars 2. The connecting column 5 is inserted into the connecting holes 3, and both ends of the connecting column 5 separately extend out of the connecting holes 3 on both sides of the clamping bar 4. The connecting piece 6 is configured to fixedly connect two connecting columns 5 located at an identical end of the clamping bar 4.

By adopting the above technical solution, the clamping bar 4 is set to prevent the connection of the supporting bars 2 from shaking, and the limiting column cooperates with the connecting piece 6 to ensure the stability and strength of the connection between the two supporting bars.

Further, the handle 6*a* is formed in the middle of the connecting piece 6.

By adopting the above technical solution, the handle 6*a* is formed in the middle of the connecting piece 6, thereby reducing the accessories and the production cost.

Further, the connecting column 5 includes the supporting portion 5*a* and the connecting portion 5*b* arranged on each of both sides of the supporting portion 5*a*. A plurality of uniformly distributed limiting grooves 8 are arranged on the connecting portion 5*b*. The connecting protrusion 6*b* is formed on each of both sides of the connecting piece 6, and the mounting cavity 9 is formed on the end face of the connecting protrusion 6*b*. The limiting ribs 10 fitted adapted to the limiting grooves 8 are formed on the inner wall of the mounting cavity 9.

By adopting the above technical solution, the limiting ribs 10 and the limiting grooves 8 are engaged to ensure the stability of the connection between the connecting column 5 and the connecting protrusion 6*b*.

Further, the connecting block 5*c* fitted to the connecting hole 3 and the receiving hole 7 is formed at the connection between the connecting portion 5*b* and the supporting portion 5*a*.

By adopting the above technical solution, the connecting block 5*c* fitted to the connecting hole 3 and the receiving hole 7 is formed at the connection between the connecting portion 5*b* and the supporting portion 5*a*, thereby securely fixing the supporting bars 2 and reducing the probability of disengagement of the connecting column 5.

Further, the door handle bar is formed by splicing two supporting bars 2 with an identical length.

By adopting the above technical solution, the door handle bar is formed by splicing two supporting bars 2 with an identical length, so that the folding door body 1 only needs to be folded once to reduce the overall packaging length without damaging the folding door body 1.

Further, the clamping bar 4 is made of aluminum alloy, and each of the connecting column 5 and the connecting piece 6 is made of plastic and formed by injection molding.

By adopting the above technical solution, the clamping bar 4 is made of aluminum alloy, which not only ensures the overall weight of the clamping bar 4, but also ensures the overall structural strength of the clamping bar 4. Each of the connecting column 5 and the connecting piece 6 is made of plastic and formed by injection molding.

Further, a plurality of uniformly distributed limiting protrusions 11 are arranged on both sides of the limiting groove 8.

By adopting the above technical solution, a plurality of uniformly distributed limiting protrusions 11 are arranged on both sides of the limiting groove 8, so as to further ensure the reliability of the connection between the connecting column 5 and the connecting protrusion 6*b*.

Further, the cross section of the supporting portion 5*a* is cross-shaped.

By adopting the above technical solution, the cross section of the supporting portion 5*a* is cross-shaped, thus saving materials while ensuring the structural strength of the supporting portion 5*a* itself.

The above embodiments are only preferred embodiments of the present invention and should not be construed as limiting the scope of protection of the present invention.

Therefore, all equivalent changes made in accordance with the structure, shape and principle of the present invention shall fall within the scope of protection of the present invention.

What is claimed is:

1. A transportable folding door, comprising a folding door body and a door handle bar arranged on a side of the folding door body; wherein a handle is arranged on the door handle bar; the folding door body is made of a flexible polyester material; the door handle bar is formed by splicing a plurality of supporting bars, and a connecting assembly is arranged between two adjacent connected supporting bars of the plurality of supporting bars, wherein connecting holes are separately formed at a connection of the two adjacent connected supporting bars, and the connecting assembly is fixedly connected to the connecting holes of the two adjacent connected supporting bars, and wherein the connecting assembly comprises a clamping bar with a U-shaped cross section, connecting columns, and a connecting piece; both ends of the clamping bar are separately provided with receiving holes corresponding to the connecting holes on the two adjacent connected supporting bars; the connecting columns are inserted into the connecting holes, and both ends of each of the connecting columns separately extend out of the connecting holes on both sides of the clamping bar; and the connecting piece is configured to fixedly connect two connecting columns located at an end of the clamping bar.

2. The transportable folding door according to claim 1, wherein the handle is formed in a middle of the connecting piece.

3. The transportable folding door according to claim 2, wherein each of the connecting columns comprises a supporting portion and a connecting portion arranged on each of both sides of the supporting portion; a plurality of uniformly distributed limiting grooves are arranged on the connecting portion; a connecting protrusion is formed on each of both sides of the connecting piece, and a mounting cavity is formed on an end face of each of the connecting protrusions; and limiting ribs fitted to the plurality of uniformly distributed limiting grooves are formed on an inner wall of the mounting cavity.

4. The transportable folding door according to claim 3, wherein a connecting block fitted to the connecting holes and the receiving holes is formed at a connection between the connecting portion and the supporting portion.

5. The transportable folding door according to claim 4, wherein the door handle bar is formed by splicing two of the supporting bars.

6. The transportable folding door according to claim 5, wherein the clamping bar is made of aluminum alloy, and each of the connecting columns and the connecting piece is made of plastic and formed by injection molding.

7. The transportable folding door according to claim 6, wherein a plurality of uniformly distributed limiting protrusions are arranged on both sides of each of the plurality of uniformly distributed limiting grooves.

8. The transportable folding door according to claim 7, wherein a cross section of the supporting portion is cross-shaped.

* * * * *